United States Patent [19]
Parker

[11] Patent Number: 5,455,326
[45] Date of Patent: Oct. 3, 1995

[54] INK-JET PRINTING COMPOSITIONS

[75] Inventor: David W. Parker, Holland, Pa.

[73] Assignee: Union Camp Corporation, Princeton, N.J.

[21] Appl. No.: 314,148

[22] Filed: Sep. 28, 1994

[51] Int. Cl.⁶ .................................................. C08G 69/34
[52] U.S. Cl. .......................... 528/335; 523/160; 528/336; 528/338; 528/339.3; 528/340; 528/346
[58] Field of Search ................................ 528/335, 336, 528/338, 339.3, 340, 346; 523/160

[56] References Cited

U.S. PATENT DOCUMENTS 4,816,549   3/1989   Rumack ................................. 528/336

*Primary Examiner*—Shelley A. Dodson
*Attorney, Agent, or Firm*—Paul & Paul

[57] ABSTRACT

A polyamide resin useful in the preparation of hot-melt inks for ink-jet printing is prepared by the condensation polymerization reaction of a monoamine, a diacid and a third reactant selected from diamines, aminoalcohols and blends thereof. Preferably, the diacid, monoamine and third reactant are reacted together in mole ratios of 2:2:1. The polyamides afford the ink compositions with a low viscosity at the elevated operating temperatures of an ink-jet printer, yet are solid at room temperature and contribute good adhesion to the printed substrate.

19 Claims, No Drawings

INK-JET PRINTING COMPOSITIONS

BACKGROUND OF THE INVENTION

1. Field of the Invention

The present invention relates to polyamide resin-based printing compositions, and in particular to printing compositions useful for hot-melt printing inks.

2. Brief Description of the Prior Art

Ink-jet printing is a non-contact printing process for the printing of many substrates such as paper, films, foils and the like. Certain ink-jet printers are designed to use hot-melt, also known as "phase-change," inks. One requirement of a hot-melt ink is that it be in the solid form at room temperature and in the liquid form when contacted with the elevated operating temperatures maintained in the printhead of a printer employing hot-melt inks. In printing that employs hot-melt inks, molten ink is ejected from the printhead and upon hitting the substrate, cools, and solidifies, and adheres to the substrate.

Hot-melt inks and components for hot-melt inks are disclosed, for example in U.S. Pat. No. 3,653,932, which teaches the use of didodecyl sebacate as a carrier for the ink.

U.S. Pat. No. 4,830,671 to Frihart et. al. discloses a composition for use in hot-melt ink-jet printing applications. The ink comprises a colorant and a resinous binder prepared from polymerized fatty acid, a diamine and a monocarboxylic acid.

U.S. Pat. No. 4,889,650 to Jaeger et. al. also relates to a hot-melt printing composition. The Jaeger ink comprises a colorant and a mixture of two fatty amide materials in which the fatty amide materials are comprised of a tetraamide compound and a monoamide compound. The Jaeger ink is capable of producing thin films of uniform thickness with a high degree of lightness and chroma and which are rectilinearly light transmissive.

U.S. Pat. No. 5,085,099 also to Jaeger et. al. discloses modified hot-melt ink compatible colorants which are comprised of a hot-melt ink-soluble complex of a tertiary alkyl primary amine and dye chromophores. The dye chromophores are materials with at least one pendant acid group in the free acid form and which absorb light in the visible wavelength region to produce color. The composition also contains fatty amide containing material comprised of a dimer acid linked tetraamide and optionally, a monoamide.

The great proportion of the amide resin prior art, and all of the art disclosed to be useful for hot-melt ink applications, teaches the preparation and use of monocarboxylic acid-terminated resins. Nowhere is monoamine termination taught as useful for hot-melt ink use.

A number of patents in the prior art, including U.S. Pat. Nos. 4,297,479; 4,684,409; 4,308,374; and 4,389,521, disclose the production of high molecular weight polyamides from equimolar amounts of diamine and diacid. These polyamides possess film-forming characteristics and are useful in the production of nylon.

U.S. Pat. No. 4,066,585 discloses polyamide resins suitable for use in hot-melt flexographic and intaglio inks comprising polymerized fatty acid, a monocarboxylic acid and a diamine or alkanolamine.

U.S. Pat. No. 3,595,816 to Barrett discloses adhesive polyamide compositions in which hydrogenated dimer acid is reacted with amine, wherein from 90–100 equivalent percent of the amine should be diamine. The remainder of the amine may optionally include monoamine.

U.S. Pat. No. 4,816,549 to Rumack discloses a polyamide resin composition which is made up of from 5–35 equivalent percent of a monoamine, 65–95 equivalent percent of a diamine (some of which must be 1,2-diaminocyclohexane), 75–100 equivalent percent of a diacid formed from polymerizing fatty acids, and 0–25 equivalent percent of an aliphatic or cycloaliphatic diacid. The monoamine terminated compositions are disclosed as being useful as binders in solution printing inks because they are soluble in toluene.

U.S. Pat. No. 2,272,466 discloses a process for the preparation of polyamides or, more specifically, diamides. The process comprises condensing a selected primary or secondary amine with a cyclic dicarboxylic acid such as terephthalic acid or isophthalic acid, where the dicarboxylic acid is characterized as being unable to form an intramolecular anhydride linkage.

There continues to exist a need in the art for hot-melt ink components having the proper combination of melting point, melt viscosity, clarity, inertness, compatibility with other components, and adhesive properties which meet the commercial demands placed on these materials, especially for printing on non-porous substrates such as polyethylene, polyesters and polystyrene films.

SUMMARY OF THE INVENTION

The present invention is directed to polyamide resin compositions including novel polyamides. The novel polyamides are prepared from a reaction mixture including monoamine, diacid, and a third reactant selected from diamine, aminoalcohol, and mixtures thereof. The present invention is further directed to hot-melt ink compositions that incorporate the polyamide resin compositions of the present invention.

The polyamide resin composition has a low viscosity at the elevated operating temperatures of printheads employing hot-melt inks. The polyamide resin composition of the present invention has a melt viscosity at 130° C. of less than about 500 centipoise, preferably less than about 250 centipoise, and more preferably less than about 100 centipoise. The polyamide resin composition is solid at room temperature and liquid at the printhead's operating temperature, and so preferably has a melting point within the range of 50° C. and 130° C. The polyamide resin composition has a low average molecular weight, preferably a number average molecular weight less than about 2500.

The polyamides of the present invention have the formula:

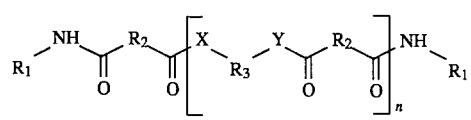

wherein
$R_1$ is selected from monovalent $C_1$–$C_{22}$ hydrocarbyl;
$R_2$ is selected from divalent $C_1$–$C_{34}$ hydrocarbyl;
$R_3$ is a divalent $C_2$–$C_{36}$ hydrocarbyl;
n is an integer from 1 to 10 (to provide 1 to 10 units), and preferably 1 to 4 (to provide from 1 to 4 units); and
X and Y are independently selected for each unit from (1) X=NH and Y=NH; (2) X=NH and Y=O; and (3) X=O and Y=NH.

The polyamides of the present invention are prepared by the condensation polymerization reaction of a monoamine, a diacid and a third reactant selected from diamines, aminoalcohols and blends thereof. The relative ratios of monoamine, diacid and third reactant are selected to provide the desired melt viscosity and physical properties. Preferably, the monoamine, diacid, and third reactant are reacted together in a molar ratio of about 1.6–2.4 to 1.6–2.4 to 0.8–1.2, respectively. More preferably, the monoamine, diacid and third reactant are reacted together in a molar ratio of about 2 to about 2 to about 1; that is, about 2:2:1; respectively.

The polyamide resin compositions of the present invention provide a desirable range of properties useful in the formulation of hot-melt inks for ink-jet printing. In addition, they afford inks with good adhesion and scuff resistance when printed on various substrates. The polyamide resin compositions of the present invention are non-volatile and stable to long-term heating.

DETAILED DESCRIPTION OF THE PREFERRED EMBODIMENTS

The polyamide resin compositions of the present invention include low molecular weight, low viscosity polyamides prepared by the condensation polymerization reaction including, and preferably consisting essentially of, a monoamine, a diacid, and a third reactant selected from diamines, aminoalcohols, and blends thereof. These low viscosity, low molecular polyamides are solid at room or ambient temperature (20°–25° C.) and have a melting point of from approximately 50° C. to about 130° C. The melting point is below the optimal operating temperatures of hot-melt ink-jet printers. The polyamide resin compositions, when heated to about 130° C., exhibit a low viscosity suitable for formulating hot-melt inks useful in ink-jet printing. The polyamide resin compositions have a melt viscosity at 130° C. of less than about 500 centipoise, preferably less than about 250 centipoise, and more preferably less than about 100 centipoise.

Monoamines useful in the practice of the present invention are preferably of the formula $R_1—NH_2$ where $R_1$ is monovalent $C_1–C_{22}$ hydrocarbyl radical. Preferably, $R_1$ is $C_1–C_{22}$ alkyl; more preferably $C_{14}–C_{22}$ alkyl, and still more preferably $C_{18}$ alkyl, that is, stearyl. Specific suitable monoamines include, but are not limited to: methylamine, ethylamine, propylamine, butylamine, amylamine, 1-methoxy-2-aminopropane, hexylamine, stearylamine, heptylamine, octylamine, nonylamine, decylamine, undecylamine, dodecylamine, tridecylamine, 1-tetradecylamine, 1-hexadecylamine, octadecylamine, behenylamine and mixtures thereof.

Secondary monoamines can be used in the practice of this invention, however, their use generally affords polyamides which are soft and somewhat tacky, making them less desirable for use as the major component in a hot-melt printing ink. A minor amount of a slightly tacky resin can be useful however in some hot-melt printing ink formulations. Secondary monoamines generally take longer to react in the formation of the polyamide in comparison to primary monoamines, and are therefore less preferred.

Diacids suitable for use in the present invention include dicarboxylic acids of the formula:

$HOOC—R_2—COOH$ where $R_2$ is a divalent $C_1–C_{34}$ hydrocarbyl radical. Preferably, $R_2$ is a divalent hydrocarbyl chain having from 1 to 34 carbon atoms, and preferably is selected from divalent aliphatic chains of 1–34 carbon atoms, divalent cycloaliphatic chains of 3–34 carbon atoms, arylene chains of from 6–34 carbon atoms, alkarylene chains of from 7–34 carbon atoms, and alkarylalkylene chains of from 8–34 carbon atoms. More preferably, $R_1$ is selected from divalent branched $C_{34}$ aliphatic radicals from $C_{36}$ dimer acid, and divalent linear $C_6–C_{10}$ aliphatic radicals.

Suitable diacids useful in the practice of the present invention include, but are not limited to oxalic acid, malonic acid, succinic acid, methylmalonic acid, fumaric acid, maleic acid, acetylene dicarboxylic acid, glutaric acid, ethylmalonic acid, dimethylmalonic acid, methylsuccinic acid, citraconic acid, glutanconic acid, itaconic acid, mesaconic acid, adipic acid, 2,2-dimethylsuccinic acid, 3-methylglutaric acid, hydromuconic acid, pimelic acid, butylmalonic acid, diethylmalonic acid, 2,2-dimethylglutaric acid, 2-ethyl-2-methylsuccinic acid, 3-methyladipic acid, cyclopentanedicarboxylic acid, suberic acid, cyclohexanedicarboxylic acid, isophthalic acid, terephthalic acid, azelaic acid, 5-norbornene-2,3-dicarboxylic acid, cyclohexylsuccinic acid, benzylmalonic acid, phenylene diacetic acid, phenylsuccinic acid, undecanedioic acid, 3-phenylglutaric acid, 10-decanedicarboxylic acid, traumatic acid, 4-phenylenedipropionic acid, naphthalene dicarboxylic acid, 11-undecanedicarboxylic acid, 12-dodecanedicarboxylic acid, 4-biphenyldicarboxylic acid, diphenic acid, hexadecanedioic acid, dimer acids, and mixtures thereof.

Dimer acids are dicarboxylic acids formed by the reaction of two or more unsaturated fatty acids such as oleic and linoleic acids at elevated temperature and acidic conditions to give a mixture typically including monomeric, dimeric, and higher mer species, and which is subsequently purified by distillation. The preparation of dimer acids is reviewed in R. W. Johnson, et El., "Polyamides From Fatty Acids," *ENCYCLOPEDIA OF POLYMER SCIENCE AND ENGINEERING*, Vol. 11 (John Wiley & Sons, New York, 1988), pp. 476–489.

It is preferred that the diacid comprises from about 70 to 100 equivalent percent of dimer acid and from about 30 to 0 equivalent percent of a linear diecid. Linear diacids which can be used in the present invention include sebacic acid, azelaic acid, adipic acid, and 1,10-decanedicarboxylic acid.

Preferably, the reaction mixture is substantially free of monoacid, although minor amounts of monoacid may be present in the diecid component as a contaminant.

Preferably a diamine used in the present invention is selected from compounds having the formula $H_2N—R_3—NH_2$ wherein $R_3$ represents divalent $C_2–C_{36}$ hydrocarbyl or a divalent poly(alkylene oxide) moiety containing between 4 and 36 carbon atoms and from 1 to 17 oxygen atoms. Preferably, $R_3$ is selected from alkylene chains with up to 36 carbon atoms, cycloalkylene chains from 6 to 36 carbon atoms, alkylarylene chains with from 7 to 36 carbon atoms, or poly(ethylene oxide) and poly(propylene oxide) and poly(butylene oxide) moieties having molecular weights between 200 and 400. More preferably, $R_3$ is divalent linear $C_2–C_6$ aliphatic.

Suitable diamines include, but are not limited to, ethylenediamine, 1,2-diaminopropane, 1,3-diaminopropane, 1,4-diaminobutane, 1,2-diamino-2-methylpropane, 1,5-diaminopentane, 2,2-dimethyl-l,3-propanediamine, 1,3-diaminopentane, 1,6-hexanediamine, 2-methyl-l,5-pentanediamine, 1,2-diaminocyclohexane, 1,4diaminocyclohexane, 1,7-diaminoheptane, 1,8-diaminooctane, 2,5-dimethyl-2,5hexanediamine, meta-xylenediamine, Jeffamine® EDR-148, 1,9-diaminononane, Jeffamine® D-230, 1,10-diaminodecane, 1,8-diamino-p-menthane, 1,8-diaminonaphthalene, isophoronediamine, 1,12-diaminododecane, and mixtures thereof.

In addition to diamines in which both the amino groups are primary amino, diamines in which one or both of the amino groups is a secondary amino can be employed in the practice of this invention. Similarly, aminoalcohols in which the amine group is a secondary amine can be employed in the practice of this invention. However, the presence of secondary amino groups generally leads to longer reaction times, and produces a product which is softer and tackier. An example of a diamine, which may be used in the practice of this invention, is piperazine. Similary, in addition to aminoalcohols in which the alcohol group is a primary alcohol group, aminoalcohols in which the alcohol group is secondary can be employed in the practice of this invention, although longer reaction times can be expected.

Preferably, an aminoalcohol used in the present invention is selected from compounds having the formula $$H_2N-R_3-OH$$

wherein $R_3$ represents divalent $C_2-C_{36}$ hydrocarbyl. Preferably, $R_3$ is selected from alkylene chains with up to 36 carbon atoms, cycloalkylene chains from 6 to 36 carbon atoms, divalent aryl radicals, and alkylarylene chains with from 7 to 36 carbon atoms. More preferably, $R_3$ is divalent linear $C_2-C_6$ aliphatic.

Suitable aminoalcohols include, but are not limited to, ethanolamine, 4-aminophenol, 1-amino-2-propanol, 3-amino-1-propanol, 2-amino-1-butanol, 4-amino-1-butanol, 5-amino-1-pentanol, and the like.

Whichever monoamine, diacid, and third reactant are utilized, it is preferable that they be combined in a molar ratios of about 1.6–2.4 moles monoamine: 1.6–2.4 moles diacid: 0.8–1.2 moles third reactant. More preferably, the molar ratios of monoamine, diacid, and third reactant are about 2:2:1, respectively. By using approximately two moles of monoamine for every two moles of diacid, it has been found that a very low number average molecular weight polyamide can be produced which effectively contributes to the low melt viscosity useful for the ink compositions of the present invention An alternative convention to characterize the relative amounts of monoamine, diacid and third reactant to employ in preparing the polyamides of the invention is based on reactive equivalents. Monoamines have one reactive equivalent per molecule. Diacids have two reactive equivalents per molecule. Diamines and aminoalcohols have two reactive equivalents per molecule. Thus, it is preferable that the monoamine, diacid and third reactant be combined in reactive equivalent ratios of about 0.8–1.2 equivalents monoamine: 1.8–2.2 equivalents diacid: 0.8–1.2 equivalents third reactant. More preferably, the reactive equivalent ratios of monoamine, diacid, and third reactant are about 1:2:1 respectively.

Yet another convention to characterize the relative amounts of monoamine, diacid and diamine to employ in preparing the polyamides of the invention is based on equivalent percents. The total equivalents of carboxylic acid present in the formulation are defined as 100%. The total equivalents of monoamine present in the formulation divided by the total equivalents of carboxylic acid, multiplied by 100, gives the equivalent percent of monoamine present. The total equivalents of diamines and aminoalcohols (where there are two equivalents per molecule of either diamine or aminoalcohol) present in the formulation divided by the total equivalents of carboxylic acid, multiplied by 100, gives the equivalent percent of third reactant present. Thus, it is preferable that the monoamine, diacid, and diamine be combined such that there are from about 40 to 60 equivalent percent monoamine, 100 equivalent percent diacid (treating monoacid impurity in the dimer acid as if it were diacid), and 40 to 60 equivalent percent third reactant.

Preferably, the hot-melt ink compositions of the present invention are prepared by standard condensation polymerization techniques for reacting, in molar ratio, two moles of monoamine, two moles of diacid, and one mole of third reactant. More preferably, the polyamide resin is prepared by condensing, in a molar ratio, two moles of the monoamine stearylamine (octadecylamine, $C_{18}H_{39}N$), two moles of the diacid known as dimer acid (prepared by the polymerization of unsaturated fatty acids available, for example, from tall oil), and one mole of the diamine ethylene diamine The condensation polymerization reaction may either be carried out on a step-wise addition basis where, for example, the monoamine is added towards the later part of the reaction, or all the reactants can be mixed together at one time. Preferably the reaction is carried out on a step-wise addition basis because if all the reactants are mixed together at one time there will sometimes occur a sudden and vigorous expansion of the reaction mixture, presumably due to the sudden release of a substantial amount of water formed during the reaction.

In a typical procedure, 100 equivalent percent of a selected diacid is charged to a reactor and heated to about 70° C. With stirring, 50 equivalent percent of a diamine, aminoalcohol, or blend thereof is added dropwise, while the temperature increases to about 130° C. The temperature is gradually increased from 130° C. to about 160° C. while the bulk of the water of reaction is distilled. The temperature is then increased to about 220° C. After substantially all of the water of reaction has been collected, the product mixture is cooled to below 150° C. and 50 equivalent percent of monoamine is added. The reaction mixture is then reheated to about 220° C. until substantially all the water of reaction has been collected. Then a small amount of catalyst, such as phosphoric acid, preferably from about 0.01 to 1.0 percent by weight, is added and the reaction mixture taken under vacuum for 2–3 hours at temperatures between 220°–250° C. This vacuum step removes condensation water and any unreacted volatile starting materials and tends to drive the reaction to completion. The extent of completion of the reaction may be observed by drawing aliquots of the reaction mixture and measuring the acid and/or amine numbers of the reaction mixture and comparing the measured values with those calculated by theory for the fully reacted polyamide resin. The product is then cooled and discharged from the reactor.

To assist the condensation reaction, a catalyst, such as phosphoric acid, may be added to the reaction mixture in catalytic proportion. The catalyst employed in the condensation reaction may be charged to the initial reaction mixture or added slowly just prior to the point at which the reaction rate slows. The preferred concentration of the catalyst in the reaction mixture is within the range of from about 0.001 to 3 weight percent, more preferably from about 0.01 to 1.0 percent by weight of the total materials charged.

Preferably, in order to avoid undue discoloration of the polyamide resin product, the condensation reaction and subsequent formulation mixing is carried out in an inert atmosphere, such as provided by carbon dioxide, nitrogen or argon gases. During the course of the condensation reaction, amidization occurs with the formation of linear oligomeric molecules and water. The formed water is advantageously allowed to distill out of the reaction vessel as the condensation reaction occurs, thus favoring completion of the condensation reaction. Distillation of the water from the reaction mixture may be assisted by allowing a slow stream of inert gas such as nitrogen to be bubbled through or over the surface of the reaction mixture. Although not necessary, an inert organic solvent such as xylene may be added to the reaction mixture in small proportions to assist in the removal of water by azeotropic distillation. Generally, the amount of such inert organic solvent should not exceed about 10 percent by weight of the reaction mixture. The heating of the reaction mixture may be carried out until there is no longer any evolution of water of condensation, indicating that the polymerization reaction has been completed. The composition is cooled and is ready for incorporation into the hot-melt printing compositions.

The condensation reaction may be carried out at atmospheric or higher pressures. However, as the end of the condensation reaction is approached, it is advantageous to operate under a slight vacuum, which aids in the removal of byproducts, solvents, condensation water, and unreacted starting materials, thus tending to drive the reaction to completion. Completion of the reaction may be observed by drawing aliquots of the reaction mixture, and measuring the acid and/or amine numbers of the reaction mixture, and comparing the measured acid and/or amine numbers with those calculated by theory for the fully reacted polyamide resin. Generally, polymerization is completed within about 8 hours, depending on the specific reactants employed, the relative proportions of the reactants, et al. Any convenient or conventional reaction vessel can be used to condense the reactants and carry out the polymerization.

The polyamide resins of the present invention are substantially neutral. Their acid and amine numbers are generally each less than 20.

The polyamide resin compositions produced according to the practice of the present invention have relatively low melting points and low melt viscosities. Diluents such as monoamides, bisamides, esters and alkanol esters may be added to further lower the melt viscosity. These also may act as solvating agents for the dye or pigment which is responsible for the color of the hot-melt composition. The ink composition is prepared by physically blending together the components, including the polyamide resin composition of the present invention and a suitable colorant, into a substantially homogeneous mixture. The components can be mixed into a finely divided state and then the mixture melted to complete the blending of the components. It has been found that it is preferable to initially melt the polyamide resin and then blend each of the additives into it. The resulting molten mixture can then be readily mixed and cast into an appropriate size and shape upon cooling for use in hot-melt ink-jet printers.

It is necessary that a hot-melt ink be of sufficiently low viscosity at the operating temperatures maintained in the printhead so that the ink can be jetted from the printhead. While hot-melt inks generally exhibit lower viscosity with increasing temperature, and thus typically have a desirably low viscosity at some temperature, the design of the printhead sets one practical limit on the temperature at which the ink can be jetted. It is more difficult and expensive to build printheads which operate at higher temperatures. It is commercially desirable to operate printheads within the temperature range of about 110° C. to 160° C., with the lower temperatures being generally preferred. Hot-melt inks useful for ink-jet printing have a melting point and a low melt viscosity within the operation temperature of the printhead in order to be "jettable", with a typical viscosity being less than or equal to 250 Centipoise at 130° C., preferably less than or equal to 150 centipoise at 130° C., and more preferably less than 50 centipoise at 130° C.

Hot-melt inks are typically comprised of a colorant and a carrier. Desirably, the carrier should dissolve the colorant, be largely transparent when solid, be non-toxic and be stable during long-term heating. The carrier must contribute to the properties needed in the hot-melt ink. These properties include compatibility with the operating conditions of the printhead, e.g., the ink must melt and be at a proper viscosity when subject to the operating temperature of the printhead, and the ink must not corrode the printhead. The ink should contain no volatile components. The carrier should impart to the printed substrate the properties of scuff resistance, resistance to offset, and good adhesion. When printed on transparent substrates, the ink should be rectilinearly light transmissive.

The carrier may comprise more than one component. In order to afford a wide latitude in formulating a hot-melt ink, it is desirable that a potential component have a wide compatibility with other potential components.

The acid number and amine number of the polyamide resin are assessed in a conventional manner. The acid number is calculated as the number of milligrams of potassium hydroxide required to neutralize the free acidity present in one gram of the polyamide resin, while the amine number is calculated as the number of milligrams of potassium hydroxide equivalent to the quantity of acid required to neutralize the free basicity in one gram of the polyamide resin.

The dropping point of the polyamide resin is measured in a conventional manner. Preferably, the polyamide resin has a dropping point of less than about 115° C.

The following examples are provided to better disclose and teach the hot-melt compositions of the present invention. They are for illustrative purposes only, and it must be acknowledged that minor variations and changes can be made without materially affecting the spirit and scope of the invention as recited in the claims that follow.

EXAMPLE I

A polyamide resin according to the present invention was prepared as follows: Into a one (1) liter kettle was charged 331.84 g UNIDYME® 14 dimer acid (1.15 equivalents, 0.58 mole, UNIDYME 14 is a commercial dimer acid available from Union Camp Corporation of Wayne, N.J. and comprises 1% monomeric fatty acid, 96% dimer acid, and about 3% trimer acid ) and 17.43 g ethylene diamine (0.58 equivalents, 0.29 mole, ethylene diamine is available from Aldrich Chemical Company of Milwaukee, Wis.). The reactants were heated under a nitrogen atmosphere to 180° C. over 6 hours, and then 156.3 g stearylamine (0.58 equivalents, 0.58 mole, stearylamine is available as Armeen 18D from Akzo Chemical Incorporated of McCook, Ill.) was added to the reactants. The mixture was heated to 204° C. over one hour, then allowed to cool to room temperature overnight. The next day the reactants were heated to 220° C. over 3.0 hours, then 4 drops (ca. 0.4 g) of phosphoric acid was added and the reactants were subjected to vacuum (of approximatedly 2 mm Hg) for 5.5 hours. The product was then discharged from the kettle.

The product had a dropping point of 75.2° C. as measured by a Mettier FP83HT Dropping Point Cell connected to a Mettier FP80HT Central Processor. The product had a melt viscosity of 62.3 centipoise as measured at 150° C. on a Brookfield RVTD viscometer running at 30 rpm with a #18 spindle (shear rate of 66 $sec^{-1}$). The product had an acid number of 4.8 and an amine number of 0.4.

EXAMPLE II

Example I was essentially repeated, this time substituting an equimolar amount of decylamine for the stearylamine. The product had a dropping point of 74.2° C., a melt viscosity at 150° C. of 76.1 centipoise, an acid number of 5.22, and an amine number of 0.27. The product was clear and somewhat tacky.

EXAMPLE III

Example I was essentially repeated, this time reactants consisted of 2 equivalents of stearylamine, 3.5 equivalents of UNIDYME 14 dimer acid, 0.5 equivalents sebacic acid, and 2 equivalents ethylene diamine. The product had a dropping point of 114.5° C., a melt viscosity at 150° C. of 59.8 centipoise, an acid number of 3.1 and an amine number of 1.6.

EXAMPLE IV

Example I was essentially repeated this time substituting ethanolamine for one half of the total amount of ethylene diamine (on an equivalents basis). The product had a dropping point of 112.9° C., a melt viscosity at 150° C. of 34 cp, an acid number of 9.6 and an amine number less than 1.0.

EXAMPLE V

Example I was essentially repeated this time substituting Jeffamine D-400 for one half of the total amount of ethylene diamine (on an equivalents basis). The product had a dropping point of 54.7° C., a melt viscosity at 150° C. of 48 cp, an acid number of less than 1.0, and an amine number of 14.

Various modifications can be made in the details of the various embodiment of the compositions of the present invention, all within the scope and spirit of the invention as defined by the appended claims.

I claim:

1. A polyamide resin composition for use in hot-melt printing inks, said polyamide resin comprising the reaction product of a condensation polymerization of a reaction mixture consisting essentially of (1) a monoamine, (2) a diacid, and (3) a third component selected from the group consisting of (a) diamines, (b) aminoalcohols, and (c) mixtures thereof; said polyamide resin having a viscosity of less than about 500 centipoise at 130° C. and an average number molecular weight less than about 2500.

2. A polyamide resin according to claim 1, wherein said reaction mixture comprises a mole ratio of 1.6–2.4 moles monoamine: 1.6–2.4 moles diacid: 0.8–1.2 moles third component.

3. A polyamide resin according to claim 2, wherein said reaction mixture comprises a mole ratio of 2 moles monoamine: 2 moles diacid: 1 mole third component.

4. A polyamide resin according to claim 1 wherein said diacid comprises from about 70 to 100 equivalent percent of dimer acid and from about 30 to 0 equivalent percent of a linear diacid.

5. A polyamide resin according to claim 1 wherein the monoamine has the the formula $R_1$—$NH_2$ and wherein $R_1$ is $C_1$–$C_{22}$ alkyl.

6. A polyamide resin according to claim 5 wherein $R_1$ is $C_{14}$–$C_{22}$ alkyl.

7. A polyamide resin according to claim 6 wherein $R_1$ is stearyl.

8. A polyamide resin according to claim 1 wherein the diacid has the formula HOOC—$R_2$—COOH wherein $R_1$ is selected from the group consisting of divalent branched $C_{34}$ aliphatic radicals derived from alimet acid, and divalent linear $C_6$–$C_{10}$ aliphatic radicals.

9. A polyamide resin according to claim 1 Wherein the diamine has the formula $H_2N$—$R_3$—$NH_2$ and wherein $R_3$ is selected from the group consisting of divalent linear $C_2$–$C_6$ aliphatic radicals and $C_{32}$–$C_{36}$ aliphatic radicals.

10. A polyamide resin composition according to claim 1 having a viscosity at 130° C. of less than about 250 centipoise.

11. A polyamide resin composition according to claim 10 having a viscosity at 130 ° C. of less than about 100 centipoise.

12. A polyamide resin composition according to claim 1 wherein the reaction mixture is substantially free of monoacid.

13. A polyamide resin composition prepared by contacting in a reaction mixture:
   (a) 0.8–1.2 reactive equivalents of a monoamine having the formula $R_1$—$NH_2$ where $R_1$ is monovalent $C_1$–$C_{22}$ hydrocarbyl;
   (b) 1.8–2.2 reactive equivalents of a dicarboxylic acid of the formula HOOC— $R_2$—COOH, where $R_2$ is a divalent $C_1$–$C_{34}$ hydrocarbyl radical; and
   (c) 0.8–1.2 reactive equivalents of a diamine of the formula $H_2N$—$R_3$—$NH_2$ wherein $R_3$ represents divalent $C_2$–$C_{36}$ hydrocarbyl.

14. A polyamide resin composition according to claim 13 wherein the reaction mixture comprises dimer acid, stearylamine, and ethylene diamine.

15. A polyamide resin composition according to claim 13 having a melting point of less than about 115° C.

16. A polyamide resin composition according to claim 13 having a viscosity at 130° C. of less than about 250 centipoise.

17. A polyamide resin composition according to claim 13 having a viscosity at 130° C. of less than about 100 centipoise.

18. A hot-melt ink-jet ink composition, comprising:
   a) a polyamide resin comprising the reaction product of a condensation polymerization of a reaction mixture consisting essentially of (1) a monoamine, (2) a diacid, and (3) a third component selected from the group consisting of (a) diamines, (b) aminoalcohols, and (c) mixtures thereof; said polyamide resin having a viscosity of less than about 500 centipoise at 130° C. and an average number molecular weight less than about 2500; and
   b) at least one colorant.

19. A hot-melt printing composition according to claim 18 further comprising at least one diluent selected from the group consisting of monoamides, bisamides, esters, alkanol esters and mixtures thereof.

* * * * *